Patented Feb. 9, 1943

2,310,470

UNITED STATES PATENT OFFICE 2,310,470

VENTILATION OF DYNAMOELECTRIC MACHINES

Georg Soldner, Nuremberg, Germany, assignor to Westinghouse Electric & Manufacturing Company, East Pittsburgh, Pa., a corporation of Pennsylvania Application October 30, 1940, Serial No. 363,446
In Germany July 5, 1939

4 Claims. (Cl. 171—252)

The present invention relates to the construction of dynamo-electric machines and, more particularly, to means for improving the ventilation of such machines.

It is customary in many types of dynamo-electric machines to provide axial passages in the rotor through which ventilating air is forced in order to carry away the heat generated in the rotor windings and core. If it is desired to make the design of such a machine at all compact so that it will take up as little room as possible, it becomes very difficult to provide sufficient open space at the ends of these passages to permit the free and unobstructed flow of air through them. This is especially true when the rotor has a winding on it, as in the case of a wound rotor induction motor, since the end turns of the winding usually extend in front of the axial passages in the rotor and thus obstruct the flow of air. Furthermore, in some cases the necessary arrangement of the windings is such that they have a fan action which tends to oppose the desired direction of flow of air through the axial passages. Both of these effects obviously are very detrimental to proper ventilation and seriously impair the effectiveness with which the machine is cooled. It is sometimes possible to arrange the windings in such a manner that the end turns do not extend in front of the ventilating passages through the rotor, but when this is done it is very difficult to properly support the end turns so that the improvement in ventilation thus obtained is offset by the increased difficulty of adequately supporting the windings.

One object of the present invention is to provide a rotor construction for dynamo-electric machines in which axial ventilating passages are provided through a wound rotor and in which there are no obstructions to the free flow of ventilating air through the passages.

A more specific object of the invention is to provide a rotor construction having axial ventilating passages in which tubular extensions of the air passages are provided which extend past the end turns of the rotor winding and which also serve as supports for the winding, so that the flow of air is not obstructed and the winding is adequately supported.

Figure 1:
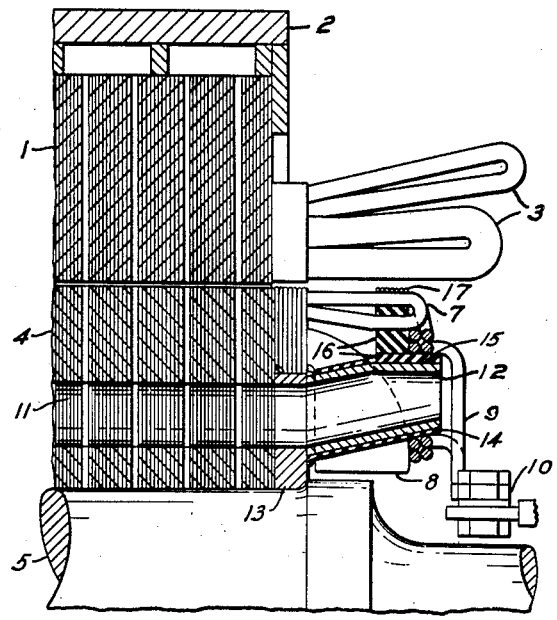
Figure 2:
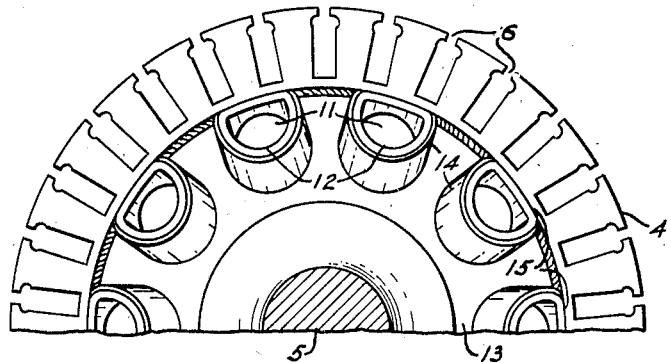

Other objects and advantages of the invention will be apparent from the following detailed description, taken in connection with the accompanying drawing, in which:

Figure 1 is a partial longitudinal sectional view of a dynamo-electric machine embodying the invention; and Fig. 2 is an end elevation of the rotor member with the windings omitted.

The invention is shown in the drawing as applied to a wound-rotor induction motor having a laminated stator core 1 which is supported in a frame 2 of any desired or usual construction. The core 1 is longitudinally slotted and suitable windings 3 are placed in the slots and connected to form a stator winding of any desired type. The rotor member also has a laminated core 4 keyed or otherwise secured on a shaft 5 which may be supported in suitable bearings in any usual or desired manner. The rotor core 4 has longitudinal slots 6 formed in its peripheral surface for the reception of windings, and a two-layer winding having coils 7 and 8 is placed in the slots 6 and connected in any desired manner. Suitable leads 9 are carried from the rotor winding to terminals 10 which are connected to slip rings on the shaft 5 (not shown).

The rotor core 4 has a plurality of longitudinal passages 11 extending through it for the passage of ventilating air to carry away the heat generated in the windings and core. As explained above, with the conventional construction, it is very difficult to arrange the end turns of the windings 7 and 8 so that they do not obstruct the ends of the passages 11 and thus interfere with the flow of ventilating air. In accordance with the present invention, however, this difficulty is avoided by the provision of tubular extensions 12 for the passages 11. These extensions are tubular elements, such as short sections of pipe, which are secured to the end plate 13 of the rotor member by welding or in any other suitable manner. Tubular members 12 may be placed at both ends of the rotor or at only one end, as required by a particular design or arrangement of the rotor winding, and they may be provided for all of the ventilating passages 11, as shown in the drawing, or for only some of the passages. The tubular extensions 12 are preferably slightly inclined outwards away from the axis of the rotor, as shown in Fig. 1, and extend in a generally axial direction past the ends of the windings 7 and 8 so that ventilating air can flow freely through the passages 11 and tensions 12, and no obstruction is offered to its flow by the end turns of the windings.

The tubular extensions 12 are preferably also used as supporting members for the windings 7 and 8, thus affording a very simple and compact construction which provides rigid bracing for the end turns of the windings. Each of the tubular members 12 is covered with a sleeve 14 of insulating material and, as shown in Fig. 1, the end turns of the winding 8 are carried around and under the tubular members 12, thus solidly supporting them in position. The outer surfaces of the members 12 are flattened at their outer ends, as indicated at 15, with the flattened portions of all the members 12 preferably lying in planes tangent to a cylinder concentric with the axis of the rotor, so as to form supports for the winding 7. This winding may rest directly on the flattened portions of the tubular members 12 or it may be supported on insulating blocks 16 which rest on the tubular members, as shown in Fig. 1. Wire bands 17 or other suitable means may be used to hold the winding 7 firmly in place on the supports.

It should now be apparent that a very simple and compact construction has been provided for rotor members of dynamo-electric machines of the type in which ventilating air passes through axial passages in the rotor and that there are no obstructions to the free flow of such air, so that very effective ventilation is obtained without any increase in the size of the machine and without any undesirable complications in the design. The tubular extensions at the end of the rotor member permit the air to flow freely past the ends of the windings and into the open space at the end of the machine, and these tubular extensions may also serve to support the end turns of the winding so that the desired result is obtained with a minimum of complication and without increasing the size of the machine.

It will be understood, of course, that various changes and modifications may be made without departing from the spirit of the invention. Thus, the windings may be of any type and may be supported upon the tubular extensions in any desired manner, and the extensions may be provided either at one end or at both ends of the rotor. When they are placed at one end of the rotor only, it may be desirable in some cases to shape them in such a manner that they act as a blower, thus further improving the ventilation of the machine.

It is to be understood, therefore, that although a particular embodiment of the invention has been shown and described for the purpose of illustration, it is not restricted to the exact details or construction shown, but in its broadest aspects, it includes all equivalent embodiments and modifications which come within the scope of the appended claims.

I claim as my invention:

1. In a dynamo-electric machine, a rotor member having slots in its peripheral surface, windings in the slots having end portions which extend beyond the ends of the slots, said rotor member also having a plurality of axial passages therethrough for the passage of ventilating air, and a plurality of separate tubular members secured to an end surface of the rotor member at the ends of at least some of said axial passages, the tubular members being inclined outwardly from the axis of the rotor and extending past the end portions of the windings, and a sleeve member of insulating material fitting over each of said tubular members, said end portions of the windings being supported by the tubular members and insulated therefrom by said sleeve members.

2. In a dynamo-electric machine, a rotor member having slots in its peripheral surface, windings in the slots having end portions which extend beyond the ends of the slots, said rotor member also having a plurality of axial passages therethrough for the passage of ventilating air, and a plurality of separate tubular members secured to an end surface of the rotor member at the ends of at least some of said axial passages, the tubular members being inclined outwardly from the axis of the rotor and extending past the end portions of the windings, insulating members covering said tubular members, and said end portions being supported by the tubular members.

3. In a dynamo-electric machine, a rotor member having slots in its peripheral surface, windings in the slots having end portions which extend beyond the ends of the slots, said rotor member also having a plurality of axial passages therethrough for the passage of ventilating air, and a plurality of separate tubular members secured to an end surface of the rotor member at the ends of at least some of said axial passages, the tubular members being inclined outwardly from the axis of the rotor and extending past the end portions of the windings, the outer surfaces of the tubular members being flattened at their ends and said end portions being supported on the flattened surfaces.

4. In a dynamo-electric machine, a rotor member having slots in its peripheral surface, windings in the slots having end portions which extend beyond the ends of the slots, said rotor member also having a plurality of axial passages therethrough for the passage of ventilating air, and a plurality of separate tubular members secured to an end surface of the rotor member at the ends of at least some of said axial passages, the tubular members being inclined outwardly from the axis of the rotor and extending past the end portions of the windings, the outer surfaces of the tubular members being flattened at their ends with the flattened portions lying in planes which are tangent to a cylinder concentric with the axis of the rotor to form supports for said end portions of the windings.

GEORG SOLDNER.